United States Patent
Maguire

(10) Patent No.: US 10,647,486 B2
(45) Date of Patent: May 12, 2020

(54) MANUFACTURE OF CAP FOR CONTAINER

(71) Applicant: Michael Joseph Maguire, San Jose, CA (US)

(72) Inventor: Michael Joseph Maguire, San Jose, CA (US)

(73) Assignee: This Cap, Inc., San Jose, CA (US)

( * ) Notice: Subject to any disclaimer, the term of this patent is extended or adjusted under 35 U.S.C. 154(b) by 166 days.

(21) Appl. No.: 15/694,441

(22) Filed: Sep. 1, 2017

(65) Prior Publication Data

US 2017/0362003 A1    Dec. 21, 2017

Related U.S. Application Data

(63) Continuation-in-part of application No. 15/480,125, filed on Apr. 5, 2017, now Pat. No. 9,932,159, which is a continuation-in-part of application No. 14/725,246, filed on May 29, 2015, now Pat. No. 9,643,762.

(30) Foreign Application Priority Data

Apr. 2, 2015 (TW) .............................. 104110838 A

(51) Int. Cl.
  *B65D 55/16* (2006.01)
  *B65D 41/34* (2006.01)
  *B29C 45/00* (2006.01)
  *B65D 41/04* (2006.01)
  (Continued)

(52) U.S. Cl.
  CPC .......... *B65D 55/16* (2013.01); *B29C 45/0017* (2013.01); *B65D 41/04* (2013.01); *B65D 41/34* (2013.01); *B65D 41/3428* (2013.01); *B65D 41/3447* (2013.01); *B26F 2210/04* (2013.01); *B29K 2023/12* (2013.01); *B29L 2031/565* (2013.01); *Y10T 83/0333* (2015.04); *Y10T 83/0596* (2015.04); *Y10T 83/6667* (2015.04)

(58) Field of Classification Search
  CPC ............. Y10T 83/0596; Y10T 83/0333; Y10T 83/0348; Y10T 83/0363; Y10T 83/16967; Y10T 83/16; Y10T 82/16967; Y10T 82/16; B26F 2210/04; B65D 41/3428; B65D 41/3447; B65D 2101/0046; B65D 2101/0053; B65D 55/16
  USPC ...................... 83/946, 54; 215/252, 253, 258
  See application file for complete search history.

(56) References Cited

U.S. PATENT DOCUMENTS 2,954,585 A * 10/1960 Simpson ................. B29C 43/18
                                                          118/DIG. 3
3,311,077 A *  3/1967 Michaelsen ............ B21D 51/44
                                                          413/10

(Continued)

*Primary Examiner* — Laura M Lee
(74) *Attorney, Agent, or Firm* — Douglas L. Weller

(57) ABSTRACT

A cap for a container is formed so that the cap has a top plate and a circular sidewall. Two opposite sides of the circular sidewall circularly connect to each other, one periphery of the circular sidewall connecting to one surface of the top plate forming a closed end, and another periphery of the circular sidewall at an opposite side of the closed end forms an opened end. Incision lines are in the circular sidewall. The incision lines form a ring member located at the opened end of the cap separated from a main body of the cap by a first incision line in between the opened end of the main body and the ring member. The ring member is connected to the main body by a plurality of connecting portions.

8 Claims, 14 Drawing Sheets

(51) Int. Cl.
*B29K 23/00* (2006.01)
*B29L 31/56* (2006.01)

(56) References Cited

U.S. PATENT DOCUMENTS

| | | | | |
|---|---|---|---|---|
| 3,812,991 A * | 5/1974 | Wurl | ................... | B65D 41/348 215/252 |
| 3,824,941 A * | 7/1974 | Hannon | ................. | B21D 51/50 413/10 |
| 3,904,062 A * | 9/1975 | Grussen | ............ | B65D 41/3447 215/252 |
| 4,293,510 A * | 10/1981 | George | ................ | B29C 31/047 264/268 |
| 4,322,009 A * | 3/1982 | Mumford | ........... | B65D 41/3447 215/253 |
| 4,720,018 A * | 1/1988 | Schetzsle | ................ | B26D 3/08 215/252 |
| 4,805,792 A * | 2/1989 | Lecinski, Jr. | ...... | B65D 41/3447 215/252 |
| 4,904,435 A * | 2/1990 | Babcock | ................... | B26F 1/18 264/154 |
| 5,295,600 A * | 3/1994 | Kowal | .............. | B65D 41/3428 215/252 |
| 5,372,672 A * | 12/1994 | Seifert | ................... | B08B 9/083 156/750 |
| 5,488,888 A * | 2/1996 | Kowal | ................... | B26D 9/00 215/252 |
| 5,522,293 A * | 6/1996 | Ingram | ................... | B26D 7/02 33/633 |
| 5,557,999 A * | 9/1996 | Smith | ..................... | B26D 3/08 83/880 |
| 5,651,299 A * | 7/1997 | Boyle | ..................... | B26D 1/62 264/154 |
| 5,916,342 A * | 6/1999 | Ingram | ................... | B26D 7/02 413/10 |
| 6,817,276 B1* | 11/2004 | Kowal | .................... | B26D 9/00 413/10 |
| 6,826,994 B1* | 12/2004 | Liao | ......................... | B26F 1/18 425/291 |
| 7,059,232 B2* | 6/2006 | Kowal | .................... | B26D 9/00 215/252 |
| D593,856 S * | 6/2009 | Kubler | ........................ | D9/446 |
| 7,673,543 B2* | 3/2010 | Albonetti | ................ | B26D 1/02 413/10 |
| 9,010,555 B2* | 4/2015 | Luzzato | ............ | B65D 41/3447 215/252 |
| 9,643,762 B2* | 5/2017 | Maguire | ................ | B65D 55/16 |
| 10,052,782 B2* | 8/2018 | Sain | ........................ | B26F 1/18 |
| 2007/0089587 A1* | 4/2007 | Liao | ......................... | B26F 1/18 83/879 |
| 2011/0114593 A1* | 5/2011 | Ishii | .................... | B65D 41/325 215/253 |
| 2015/0251827 A1* | 9/2015 | Campbell | ............. | B65D 41/34 215/252 |
| 2018/0370701 A1* | 12/2018 | Maguire | ............ | B29C 45/0017 |

\* cited by examiner

MANUFACTURE OF CAP FOR CONTAINER

CROSS REFERENCE TO RELATED APPLICATION

This application is a continuation-in-part of U.S. patent application Ser. No. 15/480,125 filed on Apr. 14, 2017, which is a continuation-in-part of U.S. patent application Ser. No. 14/725,246, filed on May 29, 2015, which claims the benefits of the Taiwan Patent Application Serial Number 104110838, filed on Apr. 2, 2015, the subject matter of all these being incorporated herein by reference.

BACKGROUND

In general, the cap of a conventional container is completely separated from its container once the container is opened. For that reason, it is easy for the separated cap to be dropped, accidentally disposed of, and/or misplaced/lost. Moreover, the separated cap when dropped can easily become soiled by coming in to contact with the ground or other uncontrolled surfaces resulting in the cap becoming no longer reusable. Furthermore, the discarded or misplaced/lost separated caps are able to and will pollute the environment and cause additional environmental problems. Therefore, in order to solve these problems, the industry has developed a few caps that will remain connected to their containers while their containers are in an open state. These few caps are thereby prevented from being separated from their containers, dropped, accidentally discarded, misplaced/lost, soiled by contact with the ground or other uncontrolled surfaces or able to pollute the environment or cause additional environmental problems.

Nonetheless, the currently existing caps with the above-mentioned functions can use complex designs and complicated connecting structures that necessitate some difficult physical manipulation by the user to return the caps to a closed sealed state. Manufacture of caps with these structures can also be complex or expensive.

DETAILED DESCRIPTION

Figure 1:
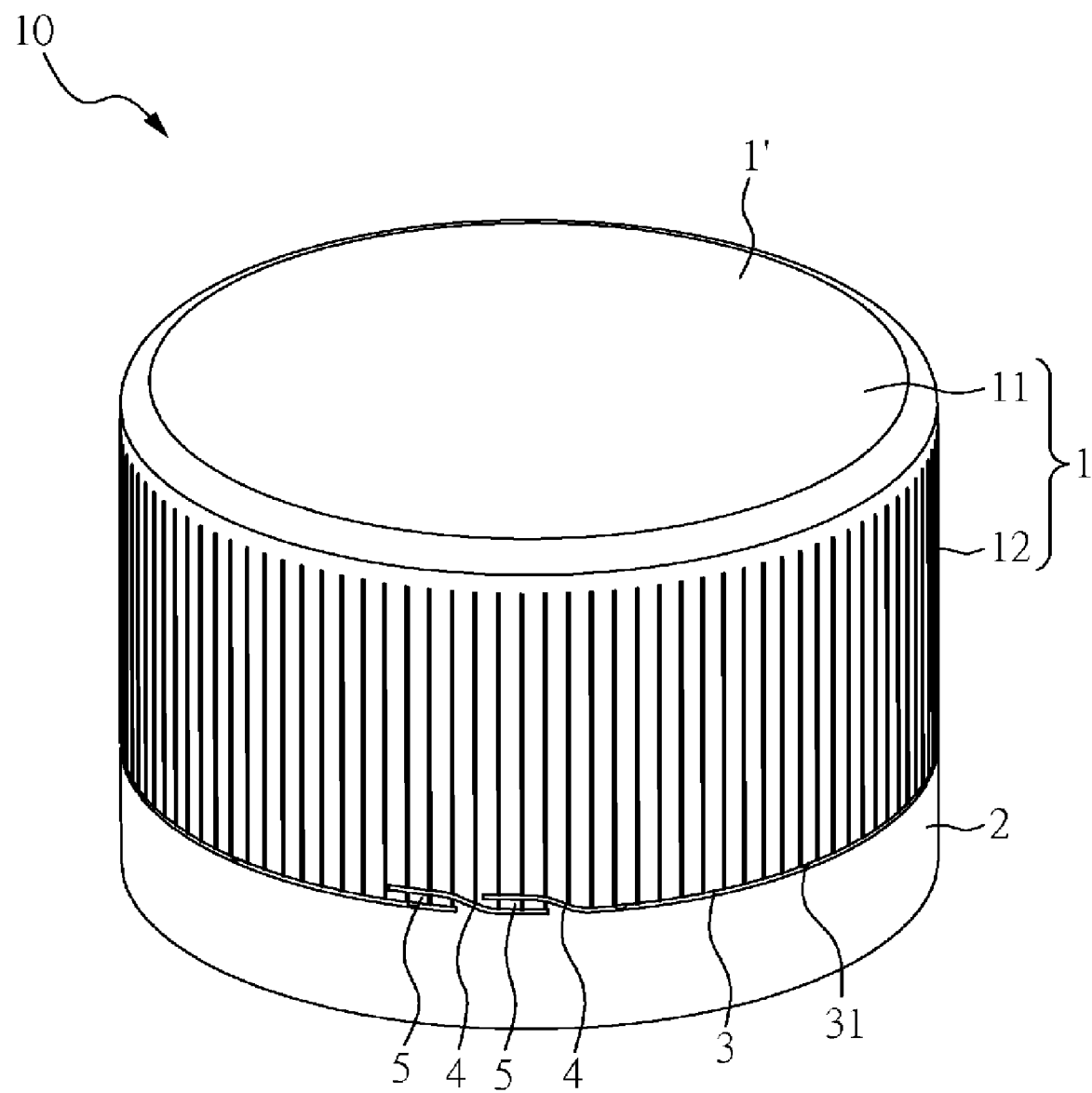
FIG. 1 is a three-dimensional schematic diagram showing an embodiment of the cap for a container in accordance with an embodiment.

FIG. 1 is a three-dimensional schematic diagram showing an embodiment of a cap for a container of the present invention. As FIG. 1 shows, the cap 10 of the present example includes a main body 1 having a top plate 11 and a circular sidewall 12. The two opposite sides of the circular sidewall 12 circularly connect to each other. One periphery of the circular sidewall 12 connects to one surface of the top plate 11 forming a closed end 1'. The other periphery of the circular sidewall 12 at the opposite side of the closed end 1' forms an opened end 1" (shown in FIG. 3). The cap 10 of the present example also contains a ring member 2, which is located at the opened end 1" of the main body 1. The ring member 2 is separated from the main body 1 by penetration lines which can be formed as part of the formation of cap 10. For example, the penetration lines are formed as part of an injection molding process or other manufacturing process in which cap 10 is formed.

For example, penetration lines may also be formed by incision. While in the description below penetration lines are often referred to as incision lines, the penetration lines can be formed by methods other than incision. The ring member 2 is separated from the main body 1 by a first incision line 3 located in between the opened end 1" of the main body 1 and the ring member 2. The first incision line 3 possesses a plurality of connecting pins 31. The plurality of connecting pins 31 located along the first incision line 3 connect the main body 1 and the ring member 2 at the two sides of the first incision line 3. The two ends of the first incision line 3 are separated by a plurality of connecting portions 5. The plurality of connecting portions 5 connect the main body 1 and the ring member 2 together. Located at one side of the plurality of connecting portions 5 is a plurality of second incision lines 4. The plurality of second incision lines 4 are also located either on the main body 1 or the ring member 2. The two ends of the plurality of second incision lines 4 and itself are not connected. The plurality of second incision lines 4 do not overlap with the first incision line 3.

Figure 2A:
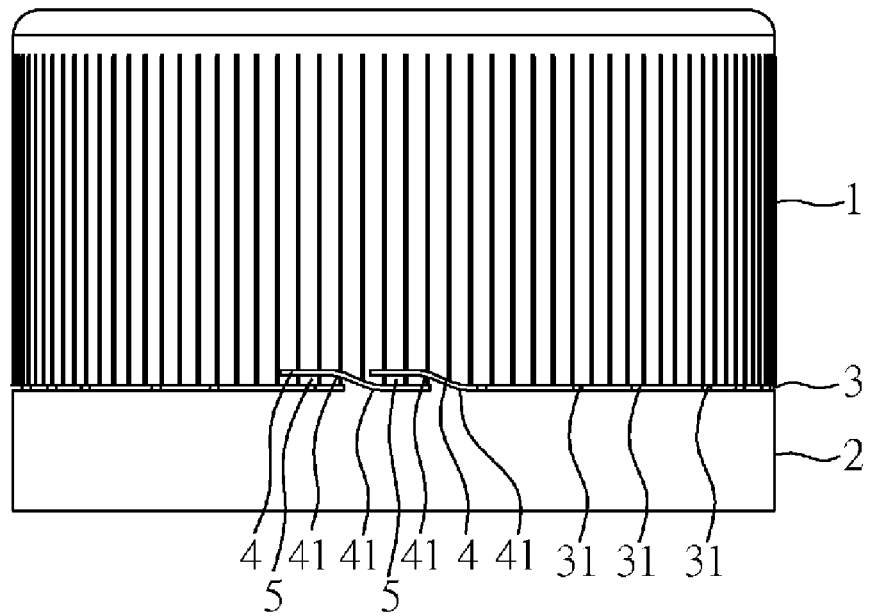
FIG. 2A-2G are schematic diagrams showing different embodiments of a cap for a container.

As FIG. 2A shows, in the present example, the plurality of connecting portions 5 are formed in between the first incision line 3 and the plurality of second incision lines 4. In the present invention, the shape of the plurality of connecting portions 5 is not particularly limited. The shape of the plurality of the connecting portions 5 is depended on the shapes of the first incision line 3 and the plurality of second incision lines 4 located at the sides of the plurality of connecting portions 5. In the present example, the shape of the plurality of connecting portions 5 is cuboid (shown in FIG. 3). In the present invention, the quantity of the plurality of connecting portions 5 is not particularly limited. However, in the present example, the quantity of the plurality of connecting portions 5 is 2. In the present invention, the spacing between each of the plurality of connecting portions 5 is not particularly limited as well. However, in the present example, each of the plurality of connecting portions 5 is separated by parts of the plurality of second incision lines 4.

In the present invention, the quantity of the plurality of second incision lines 4 is not particularly limited. However, in the present example, the quantity of the plurality of second incision lines 4 is 2. As FIG. 2A shows, only the main body 1 possesses the plurality of second incision lines 4. One of the two second incision lines 4 is connected to parts of the first incision line 3. Furthermore, parts of the plurality of second incision lines 4 are parallel to the first incision line 3.

In the present invention, the first incision line 3 and the plurality of second incision lines 4 are not particularly limited. The first incision line 3 and the plurality of second incision lines 4 can individually be preferred to be straight lines, curved lines, polylines, arc lines, or the combinations thereof. In the present example, the first incision line 3 is a straight line. The plurality of second incision lines 4 can also be more preferably be L-shaped lines, S-shaped lines, Z-shaped lines, or the combinations thereof. In the present example, the plurality of second incision lines 4 are Z-shaped lines. In the present invention, the corners 41 of the plurality of second incision lines 4 are not particularly limited. The corners 41 of the plurality of second incision lines 4 are preferred to be curved corners, chamfered corners, sharp corners, or the combinations thereof. In the present example, the corners 41 of the plurality of second incision lines 4 are curved corners.

In the present invention, the first incision line 3 and the plurality of second incision lines 4 surround parts of the circular sidewall 12 or the ring member 2, but do not fully surround the circular sidewall 12 or the ring member 2. The lengths of the first incision line 3 and the plurality of second incision lines 4 surrounded the circular sidewall 12 or the ring member 2 are not particularly limited. In the present example, the length of the first incision line 3 surrounded the circular sidewall 12 or the ring member 2 is longer than the lengths of each of the plurality of second incision lines 4 surrounded the circular sidewall 12 or the ring member 2. In the present invention, it is preferred that the first incision line 3 surrounds larger than ¾ of the circular sidewall 12 or the ring member 2 and more preferably larger than ⅘ of the circular sidewall 12 or the ring member 1. In the present example, the first incision line 3 surrounds larger than ⅘ of the circular sidewall 12 or the ring member 2. In the present invention, it is preferred that the plurality of second incision lines 4 surround less than ¾ of the circular sidewall 12 or the ring member 2, more preferably less than ½ of the circular sidewall 12 or the ring member 2, and most preferably less than ¼ of the circular sidewall 12 or the ring member 2. In the present example, the plurality of second incision lines 4 surround less than ⅕ of the circular sidewall 12.

Figure 2B:
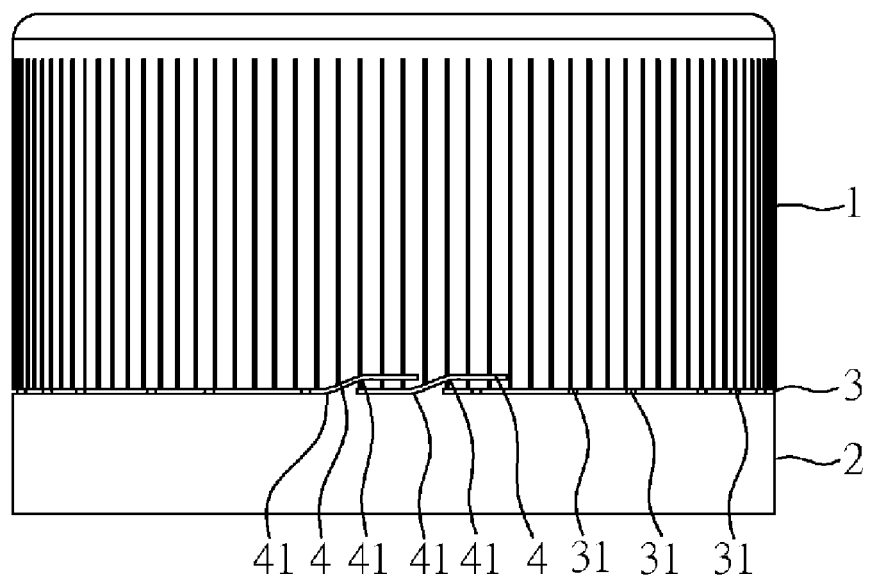

FIG. 2B is a schematic diagram showing another embodiment of the cap for a container of the present invention. The cap of the present example and the cap shown in FIG. 1 are the same except that the plurality of second incision lines 4 and the plurality of second incision lines 4 shown in FIG. 2A are opposite to each other. Nevertheless, the opening directions of the cap and that of the cap shown in FIG. 2A are still the same (both are in the anti-clockwise direction; that is rotation in the right direction in FIG. 2A or FIG. 2B).

Figure 2C:
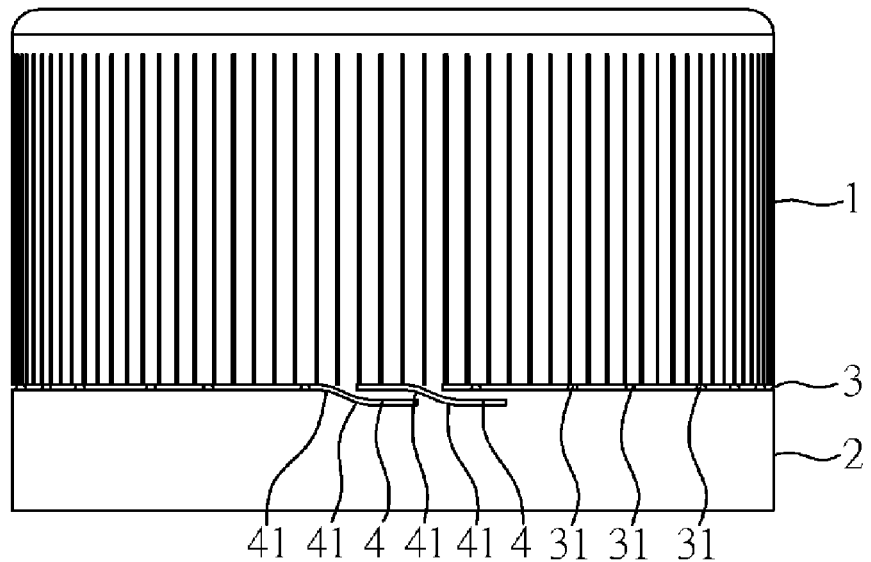

FIG. 2C is a schematic diagram showing another embodiment of the cap for a container of the present invention. The cap of the present example and the cap shown in FIG. 1 are the same except that only the ring member 2 possesses the plurality of second incision lines 4 and the plurality of second incision lines 4 surround less than ⅕ of the ring member 2.

Figure 2D:
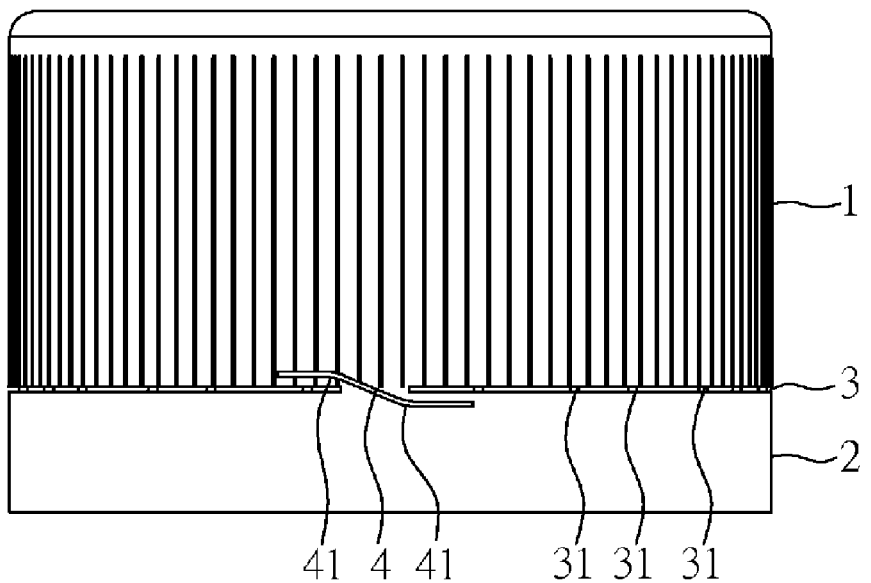

FIG. 2D is a schematic diagram showing another embodiment of the cap for a container of the present invention. The cap of the present example and the cap shown in FIG. 1 are the same except that the quantity of the plurality of second incision lines 4 is 1, the second incision line 4 extends from the main body 1 to the ring member 2 or from the ring member 2 to the main body 1, the second incision line 4 and the first incision line 3 are not connected, the corners 41 of the second incision line 4 (Z-shaped line) are sharp corners, and the second incision line 4 surrounds less than ⅕ of the circular sidewall 12 and less than ⅕ of the ring member 2.

Figure 2E:
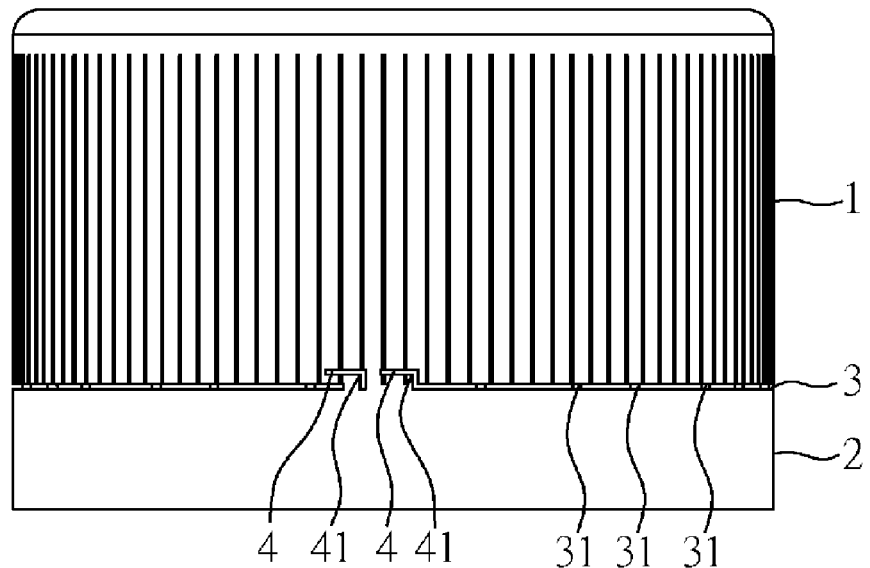

FIG. 2E is a schematic diagram showing another embodiment of the cap for a container of the present invention. The cap of the present example and the cap shown in FIG. 1 are the same except that the plurality of second incision lines 4 are L-shaped lines and the corners 41 of these L-shaped lines are sharp corners.

Figure 2F:
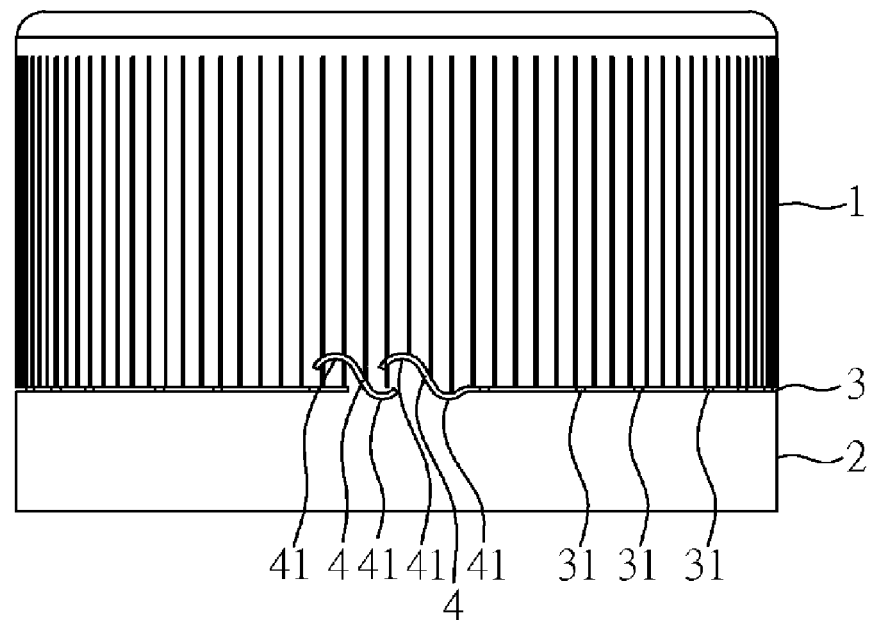

FIG. 2F is a schematic diagram showing another embodiment of the cap for a container of the present invention. The cap of the present example and the cap shown in FIG. 1 are the same except that the plurality of second incision lines 4 and the first incision line 3 are not parallel to each other and the plurality of second incision lines 4 are S-shaped lines.

Figure 2G:
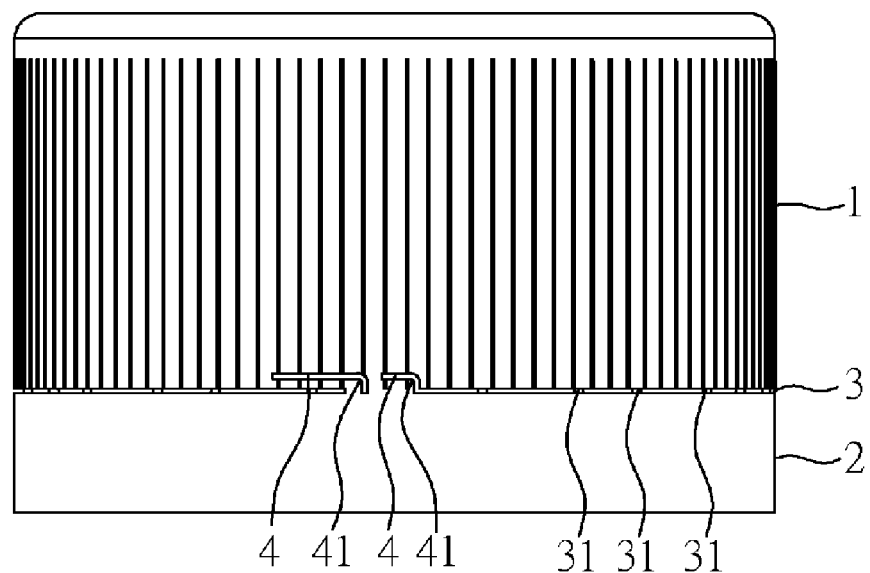

FIG. 2G is a schematic diagram showing another embodiment of the cap for a container of the present invention. The cap of the present example and the cap shown in FIG. 2E are the same except that the corners 41 of the plurality of second incision lines 4 (L-shaped lines) are curved corners and one of the second incision lines 4 surrounds less than ½ of the circular sidewall 12.

Figure 3:
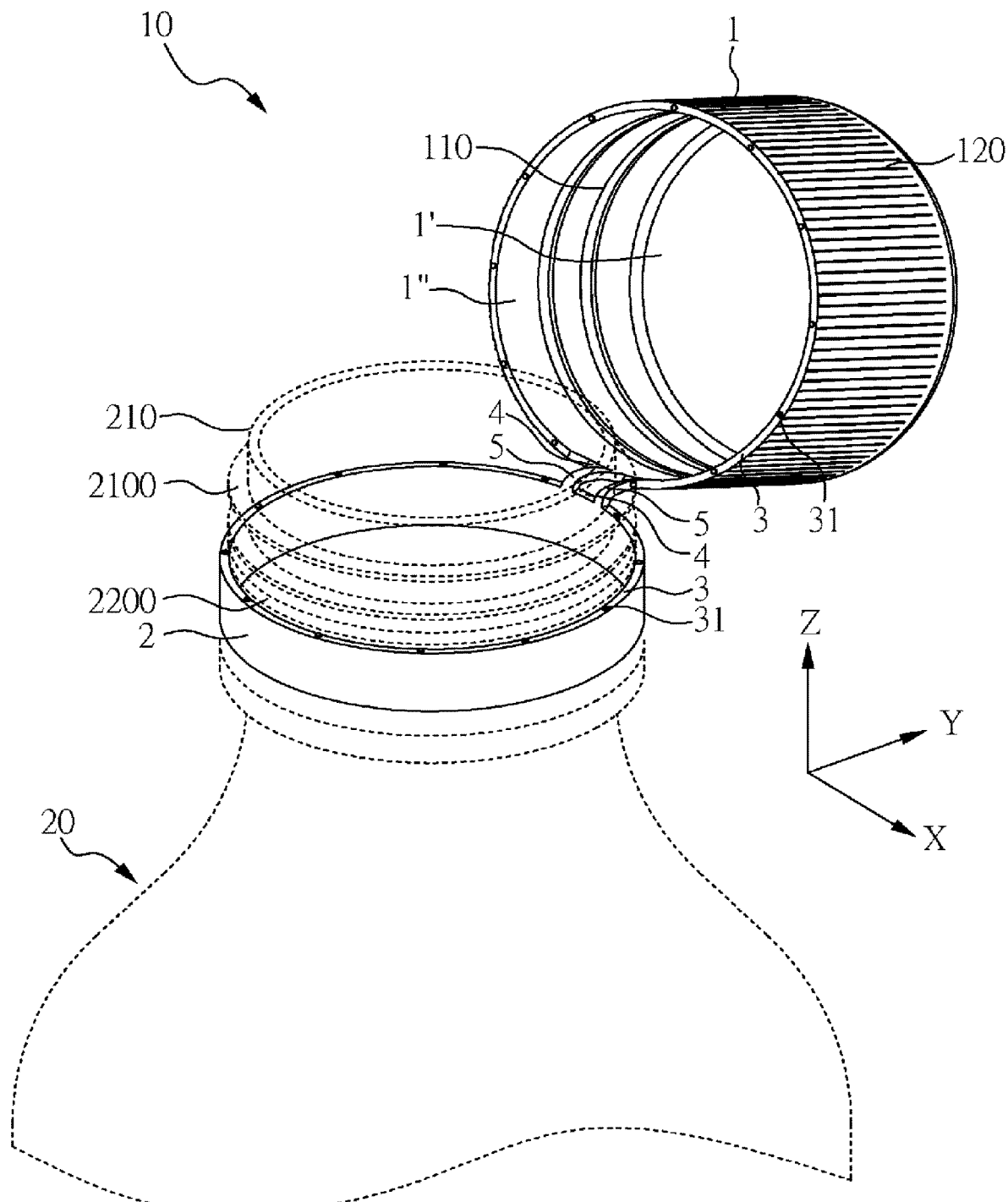
FIG. 3 is a three-dimensional schematic diagram showing an embodiment for a container being separated from a container

FIG. 3 is a three-dimensional schematic diagram showing an embodiment of the cap for a container of the present invention being separated from a container, wherein the cap shown can be any one of the caps of any one of the above-mentioned examples. Hereinafter, the practical application of the cap provided by the present invention will be further described in detail using the cap shown in FIG. 1.

In the present invention, the cap 10 provided can be used together with any conventional containers without any particular limitation as long as the cap 10 and the container 20 can be assembled together. In the present invention, the shape of the cap 10 is not particularly limited. As shown in FIG. 3, the inner side of the cap is circular. In the present invention, the shape of the container 20 is also not particularly limited as well. As shown in FIG. 3, the opening 210 of the container is a circular opening. In the present invention, the container 20 is preferred to be a round bottle or a round can. As shown in FIG. 3, the container 20 is a bottle with a circular opening.

The main body 1 of the cap 10 provided by the present invention can control the opening and closing of the opening 210 of the container. As shown in FIG. 3, the inner side of the main body 1 has thread 110. Through a complementary thread structure 2100 at the outer side of the opening 210 of the container, the main body 1 can be screwed opened (in anti-clockwise direction) and screwed closed (not shown) (in clockwise direction) on the opening 210 of the container by rotation. In the present invention, when the main body 1 of the cap 10 provided is screwed closed on the opening 210 of the container, the closed end 1' of the main body 1 will abut against the opening 210 of the container. Meanwhile, the opened end 1" of the main body 1 will face toward the opening 210 of the container and cover and fit on the opening 210 of the container. Consequently, the opening 210 of the container is in a closed state with the container 20 remaining sealed.

In the present invention, the outer side of the main body 1 of the cap 10 provided can have a knurled portion 120. When the container 20 is to be opened, the knurled portion 120 can facilitate applying a force to rotate and separate the main body 1 and the ring member 2. In the present invention, depending on the actual needs, the first incision line 3 disposed between the main body 1 and the ring member 2 of the cap 10 provided can have a plurality of connecting pins 31 to connect the main body 1 and the ring member 2. The shape, size, quantity, and spacing of the plurality of connecting pins 31 are not particularly limited. When the size and quantity of the plurality of connecting pins 31 of the first incision line 3 are smaller and the spacing of the plurality of connecting pins 31 is larger, the force needed to break the plurality of connecting pins 31 is smaller. On the contrary, when the size and quantity of the plurality of connecting pins 31 of the first incision line 3 are larger and the spacing of the plurality of connecting pins 31 is smaller, the force needed to break the plurality of connecting pins 31 is larger. In the present example, the size and quantity of the plurality of connecting pins 31 of the first incision line 3 are smaller and the spacing of the plurality of connecting pins 31 is larger. In addition, the plurality of second incision lines 4 do not possess a plurality of connecting pins 31. Therefore, the force needed to break the plurality of connecting pins 31 is smaller. Subsequently, users can separate the main body 1 and the ring member 2 more easily; that is, the cap 10 can be opened from the opening 210 of the container more easily.

In the present invention, when the main body 1 of the cap 10 provided by the present invention has been screwed opened from the opening 210 of the container, the plurality of connecting portions 5 will connect the main body 1 and the ring member 2 together. Since the ring member 2 is fitted below a bulge portion 2200 of the opening 210 of the container; thus, the ring member 2 will not detach from the opening 210 of the container. As a result, the connection between the main body 1 separated from the opening 210 of the container with the ring member 2 will allow the main body 1 to still remain in a connected state with the container 20. Moreover, the plurality of connecting portions 5 can also allow the main body 1 to remain in an opened state. The plurality of connecting portions 5 will prevent the main body 1 from interfering the opening 210 of the container. The plurality of connecting portions 5 will also decrease the free movement of the main body 1. As a result, when emptying the contents from the container 20, the plurality of connecting portions 5 can prevent the main body 1 from touching other objects due to its free movement. For example, when the container 20 is a water bottle, when users are drinking from the water bottle, the plurality of connecting portions 5 will prevent the main body 1 from touching the faces and any body parts of the users. In addition, the plurality of connecting portions 5 can also prevent the residual contents at the inner side of the main body 1 to spill out easily by decreasing the free movement of the main body 1. And since the ring member 2 fitted on the opening 210 of the container can freely rotate; hence, the plurality of connecting portions 5 will not be pulled off easily.

In the present invention, the cap provided can be made by using any materials known in the art, wherein the material for the cap is preferred to be plastic. The cap can be manufactured by any processes known in the art. For example, the manufacturing process of the cap is by injection molding. The first incision line and the plurality of second incision lines can be formed by any known methods. In all the above-mentioned examples, the first incision line and the plurality of second incision lines are formed by rotary cutting and the incisions are done by cutting tools or laser cutting.

Overall, the design and structure of the cap for a container provided by the present invention are simple. Simply just by using a first incision line and a plurality of second incision lines, a plurality of connecting portions are created. The plurality of connecting portions created can connect the container with the cap separated from the container to prevent the cap from being lost or discarded. The plurality of connecting portions created can also maintain the cap in an opened state where the cap does not interfere the opening of the container and the free movement of the cap is decreased. The end result is a cap with an enhanced operating convenience. Unlike conventional caps, the cap of the present invention does not require to additionally dispose a barrier structure in order to achieve the same functions of the cap described above.

Figure 4:
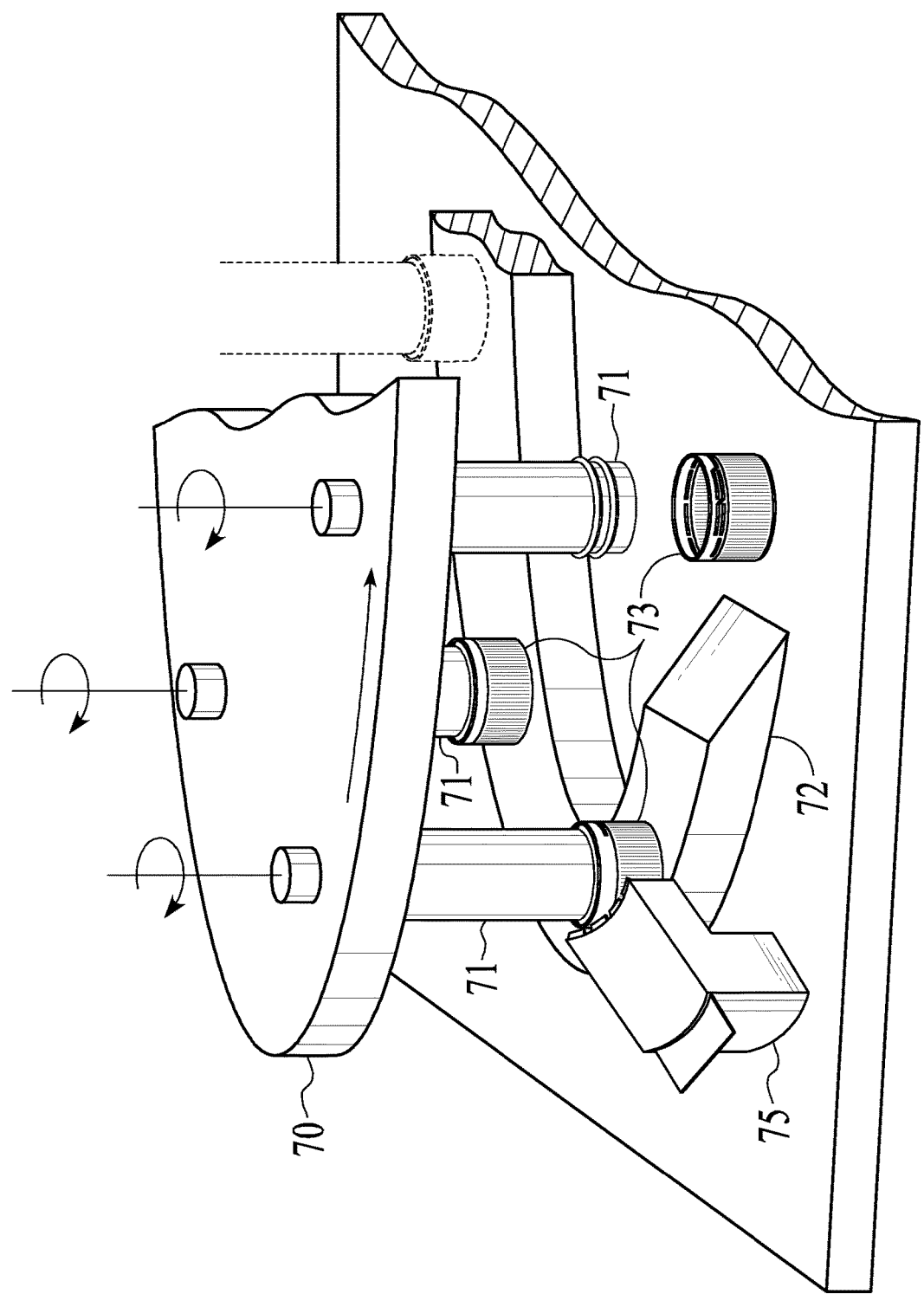
FIG. 4 shows part of a manufacturing system used to engrave incision lines within a cap in accordance with an implementation.
Figure 5:
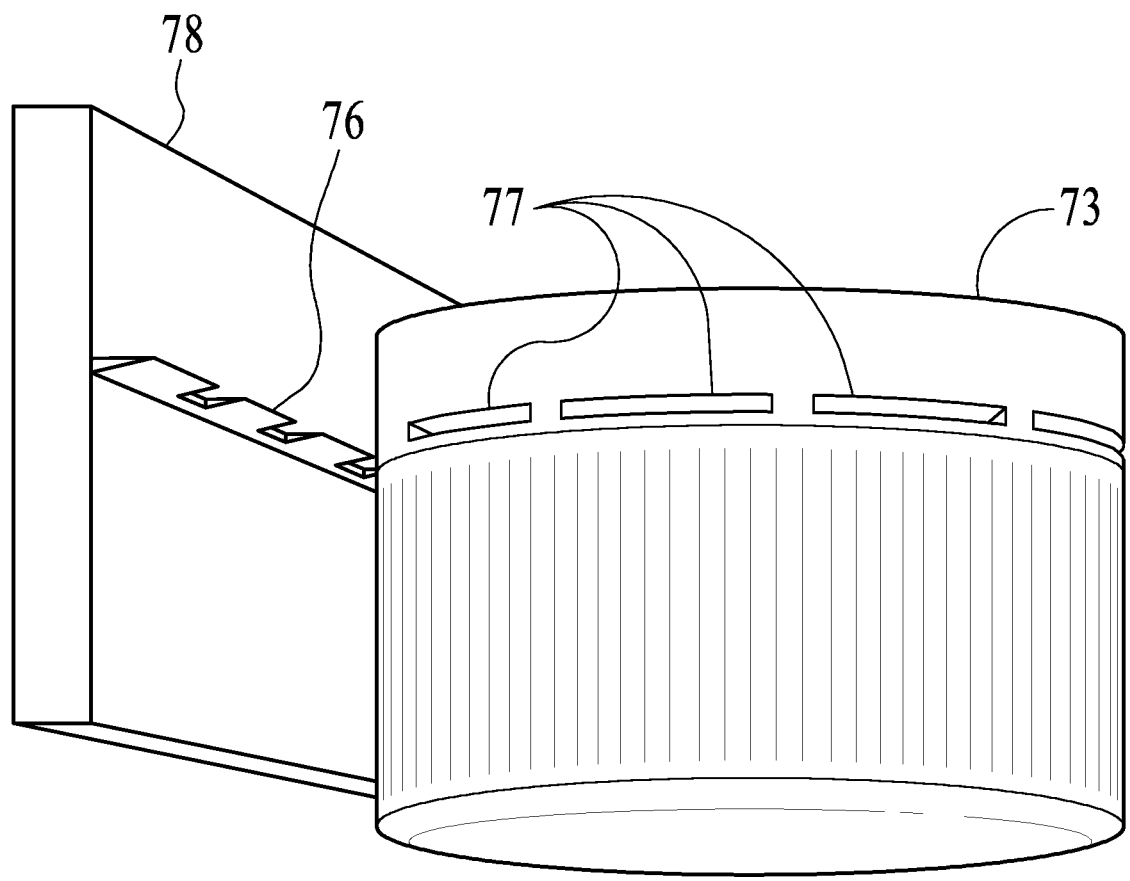
FIG. 5 illustrates incision lines engraved within a cap in accordance with an implementation.

FIG. 4 shows part of a manufacturing system 70 used to engrave incision lines within caps 73. Caps 73 are mounted on spindles 71 and supported by bases 72. Caps 73 are rotated as they pass a blade support structure 75 that holds blades 76, as illustrated by FIG. 5. The rotation of caps 73 against blades 76 result in incision lines engraved within caps 73.

Figure 6:
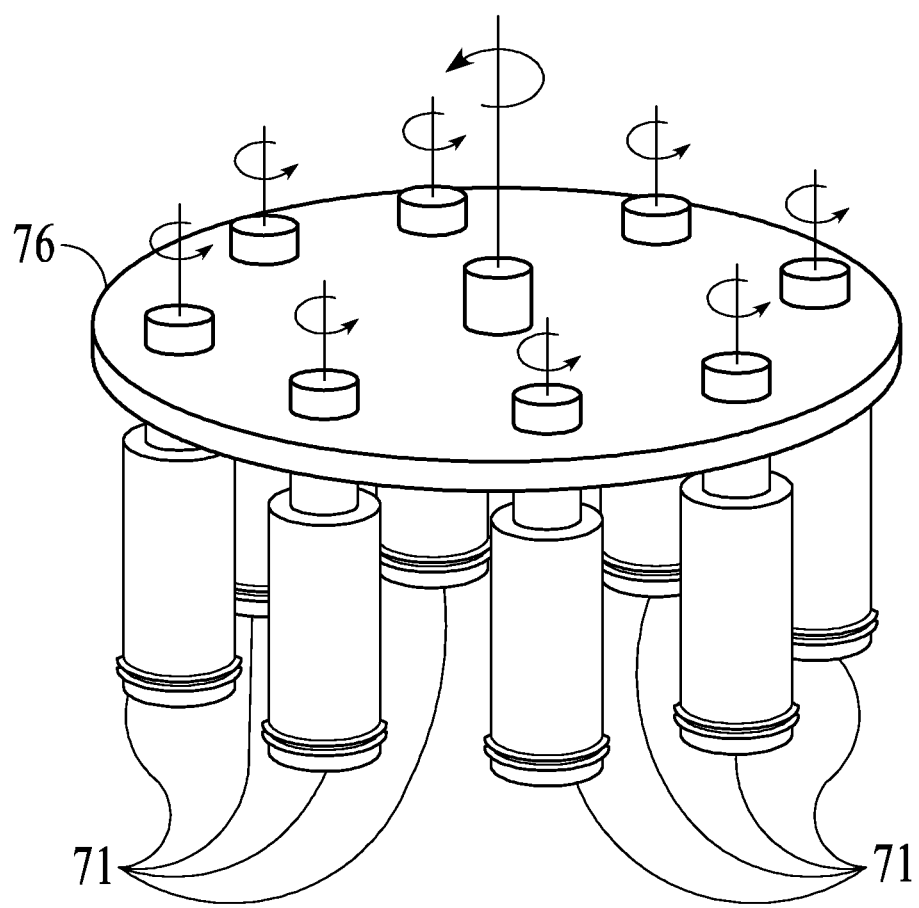
FIG. 6 shows spindles of a manufacturing system used to engrave incision lines within a cap in accordance with an implementation.

FIG. 6 shows spindles 71 mounted on a spindle support 76.

Figure 7:
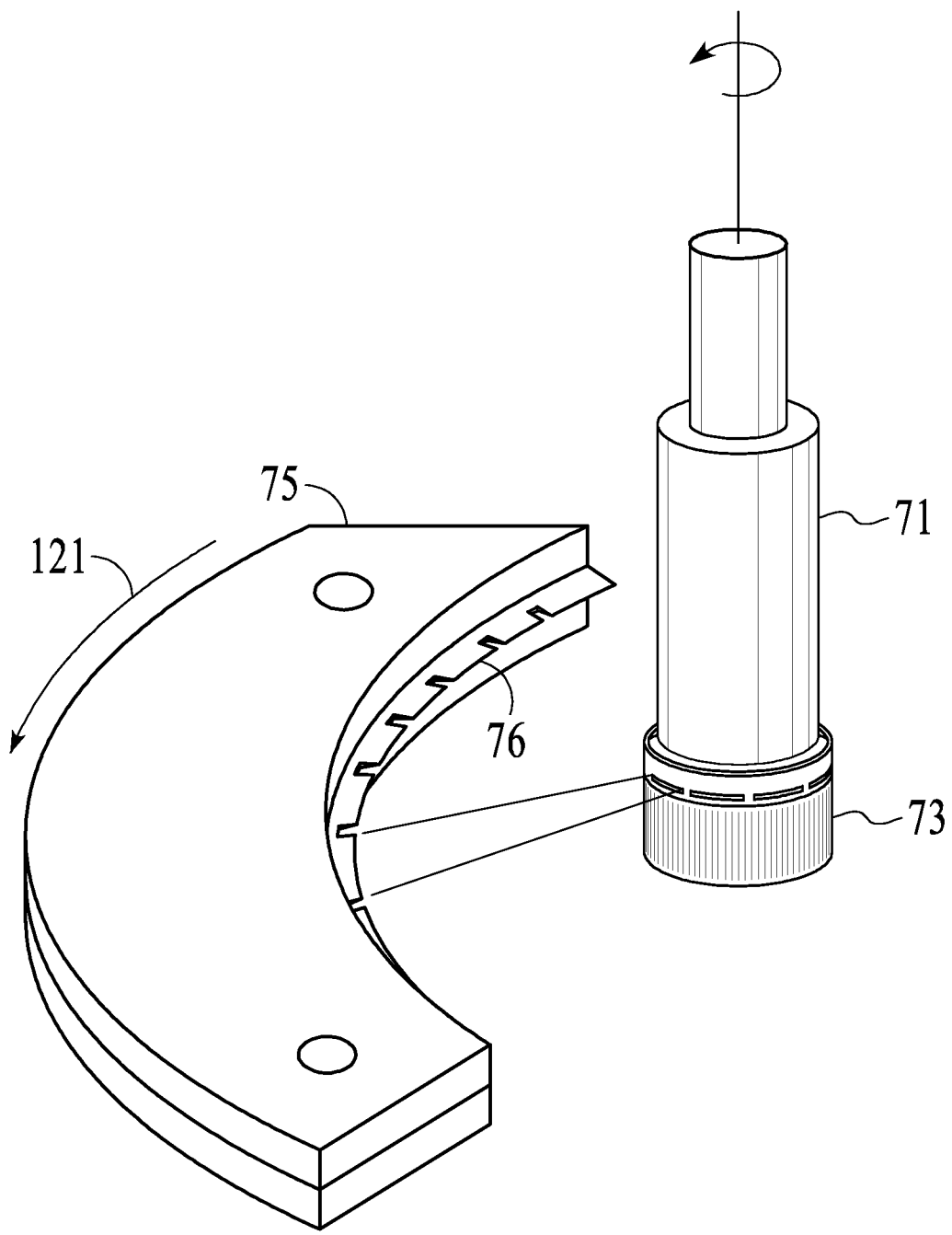
FIG. 7 shows blades used to engrave incision lines within a cap in accordance with an implementation.

FIG. 7 shows a path 121 that caps 73 travels along blades 76 in order to produce incision lines in caps 73.

FIG. 8, FIG. 9, FIG. 10, FIG. 12 and FIG. 12 show blade patterns for blades used to engrave incision lines within caps.

Figure 8:
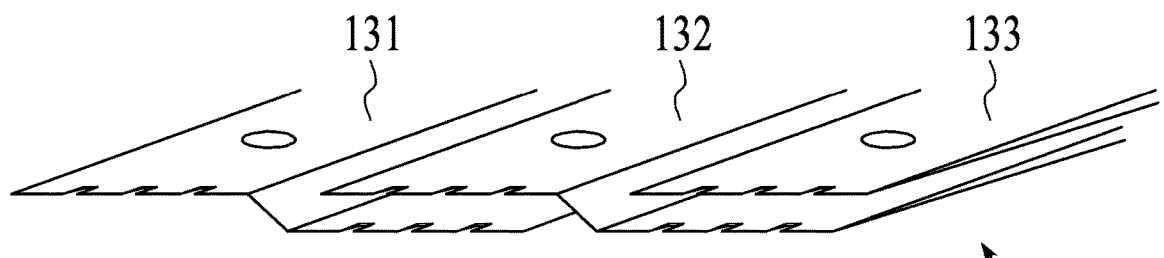
FIG. 8, FIG. 9, FIG. 10, FIG. 11 and FIG. 12 show blade patterns for blades used to engrave incision lines within a cap in accordance with implementations.

FIG. 8 shows a blade pattern 130 that uses a blade 131, a blade 132 and a blade 133 to produce incision lines in caps 73 that will result in connecting portions of each cap attaching the cap to a ring section. Blade 131 includes a first blade section and a second blade section located on a different plane than the first blade section. A third blade section forms a diagonal connection between the first blade section and the second blade section. Likewise, blade 132 includes a first blade section and a second blade section located on a different plane than the first blade section. The first blade section is located on a same plane as the first blade section blade 131. The second blade section is located on a same plane as the second blade section blade 131. A third blade section forms a diagonal connection between the first blade section and the second blade section. Blade 133 is located on the same plane as the first blade section of blade 131. When the cap is mounted on a container, the connection portions assure the cap, through attachment to the ring, remains attached to the container even after the cap is removed the container opening, as described above. Notches in blade 131, blade 132 and blade 133 form bridge connection portions between the cap and the ring section. The bridge connection portions are broken when the cap is mounted on a container and the container is opened by unscrewing the cap.

Figure 9:
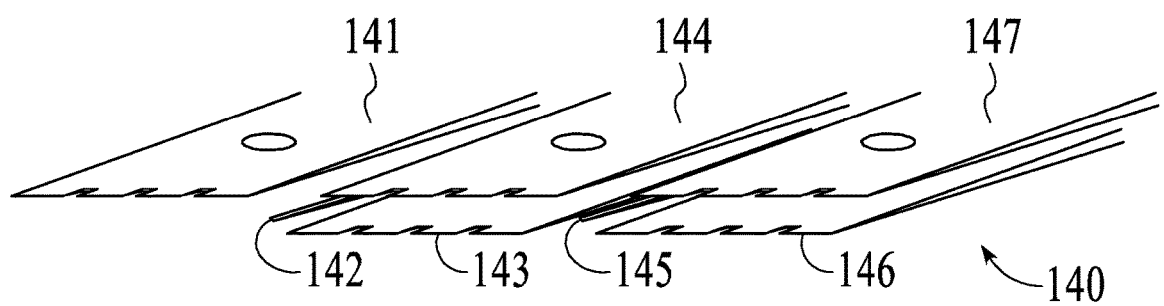

FIG. 9 shows a blade pattern 140 that uses a blade 141, a blade 142, blade 143, a blade 144, a blade 145, a blade 146 and a blade 147 to produce incision lines in caps 73 that will result in connecting portions of each cap attaching the cap to a ring section. Blades 141, 144 and 147 are all located on a first plane. Blades 143 and 146 are both located on a second plane. Blades 142 and 145 are both located on a third plane between the first plane and the second plane. Blades 142 and 145 make smaller incisions that the other blades in the plurality of blades. Blade 142 and blade 145 are in a diagonal orientation between the first plane and the second plane. Alternatively, blade 142 and a blade 145 can be in a horizontal or a vertical orientation while located between the first plane and the second plane.

When a cap is mounted on a container, the connection portions assure the cap, through attachment to the ring, remains attached to the container even after the cap is removed the container opening, as described above. Notches in blade 141, blade 143, blade 146 and blade 147 form bridge connection portions between the cap and the ring section. The bridge connection portions are broken when the cap is mounted on a container and the container is opened by unscrewing the cap.

Figure 10:
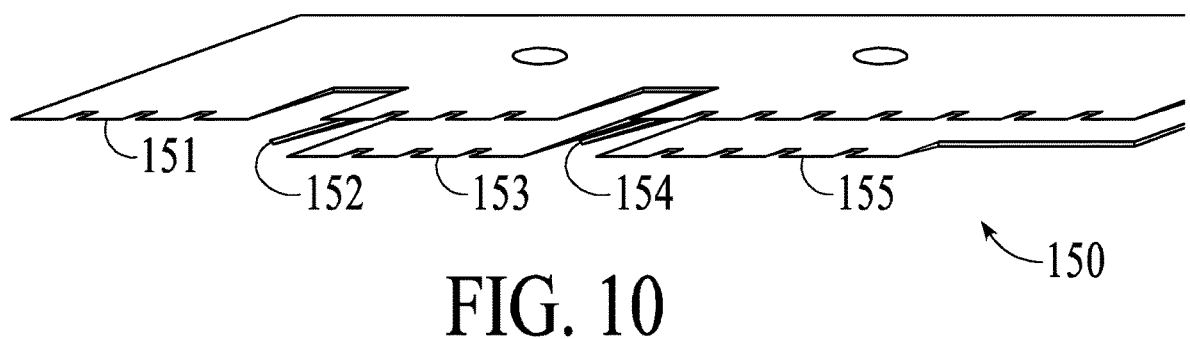

FIG. 10 shows a blade pattern 150 that uses a blade 151, a blade 152, blade 153, a blade 154 and a blade 155 to produce incision lines in caps 73 that will result in connecting portions of each cap attaching the cap to a ring section. Blade 151 is located on a first plane and has a first gap and a second gap. Blade 153 and blade 155 are both located on a second plane. Blade 152 and blade 154 are both located on a third plane between the first plane and the second plane. Blade 152 is located near the first gap and blade 154 is located near the second gap. Blades 152 and 154 make smaller incisions that the other blades in this configuration. Blade 152 and blade 154 are in a diagonal orientation between the first plane and the second plane. Alternatively, blade 152 and a blade 154 can be in a horizontal or a vertical orientation while located between the first plane and the second plane. When the cap is mounted on a container, the connection portions assure the cap, through attachment to the ring, remains attached to the container even after the cap is removed the container opening, as described above. Notches in blade 151, blade 153 and blade 155 form bridge connection portions between the cap and the ring section. The bridge connection portions are broken when the cap is mounted on a container and the container is opened by unscrewing the cap.

Figure 11:
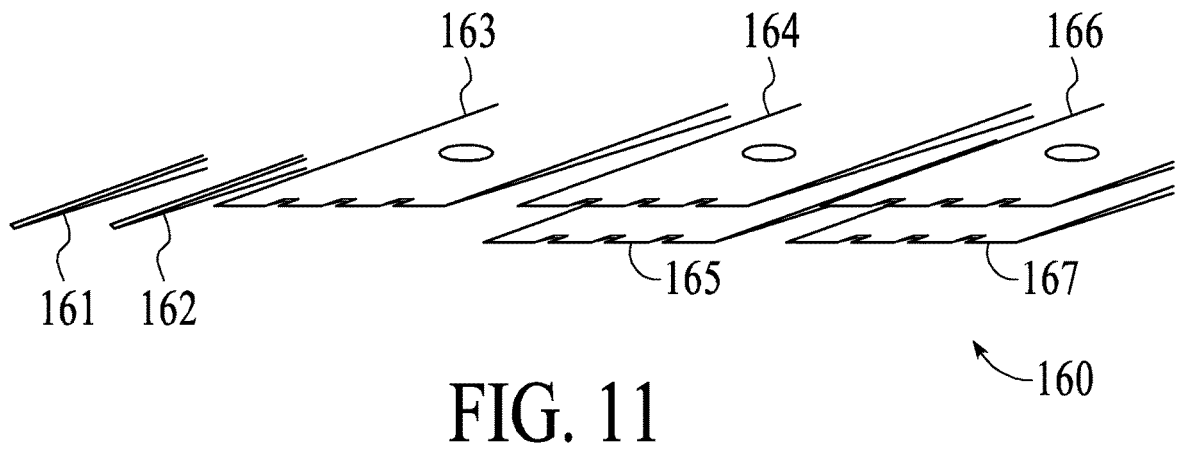

FIG. 11 shows a blade pattern 160 that uses a blade 161, a blade 62, blade 163, a blade 164, a blade 165, a blade 166 and a blade 167 to produce incision lines in caps 73 that will result in connecting portions of each cap attaching the cap to a ring section. Blades 163, 164 and 146 are all located on a first plane. Blades 165 and 167 are both located on a second plane. Blades 161 and 162 are both located on a third plane between the first plane and the second plane. Blades 161 and 162 make smaller incisions that the other blades in the plurality of blades. Blade 161 and blade 162 are in a diagonal orientation between the first plane and the second plane. Alternatively, blade 161 and a blade 162 can be in a horizontal or a vertical orientation while located between the first plane and the second plane. When the cap is mounted on a container, the connection portions assure the cap, through attachment to the ring, remains attached to the container even after the cap is removed the container opening, as described above. Notches in blade 163, blade 164, blade 165, blade 166 and blade 167 form bridge connection portions between the cap and the ring section. The bridge connection portions are broken when the cap is mounted on a container and the container is opened by unscrewing the cap.

Figure 12:
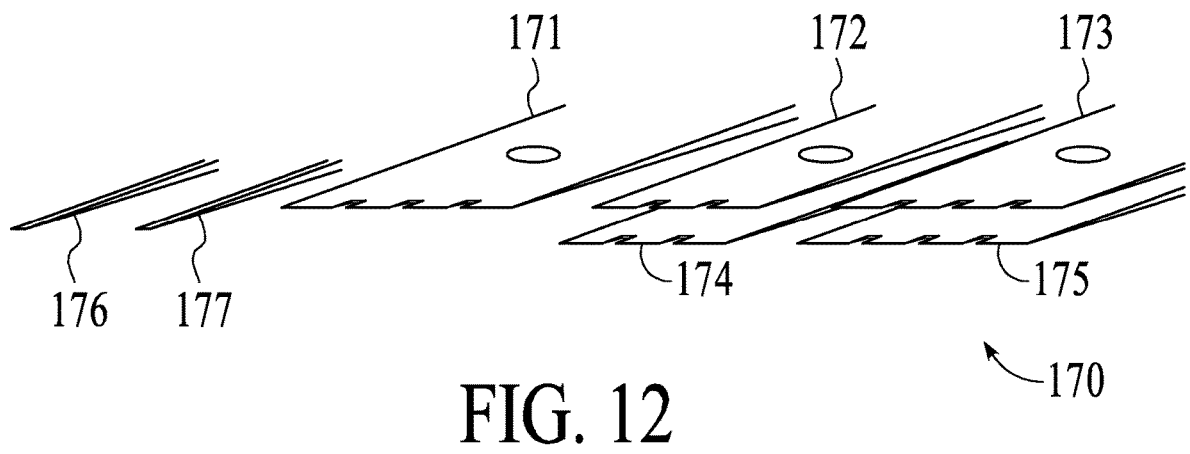

FIG. 12 shows a blade pattern 170 that uses a blade 171, a blade 172 and a blade 173 in a first plane. A blade 174 and a blade 175 are located in a second plane. A blade 176 and a blade 177 are in a horizontal orientation between the first plane and the second plane. Alternatively, blade 176 and a blade 177 can be in a diagonal or a vertical orientation while located between the first plane and the second plane. When the cap is mounted on a container, the connection portions assure the cap, through attachment to the ring, remains attached to the container even after the cap is removed the container opening, as described above. Notches in blade 163, blade 164, blade 165, blade 166 and blade 167 form bridge connection portions between the cap and the ring section. The bridge connection portions are broken when the cap is mounted on a container and the container is opened by unscrewing the cap.

Figure 13:
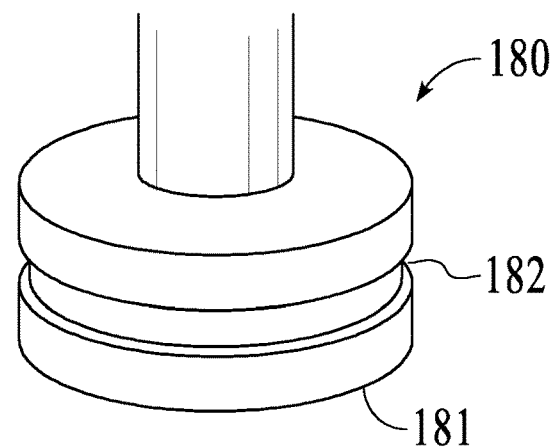
FIG. 13, FIG. 14, FIG. 15 and FIG. 16 illustrate grooves placed within a spindle to aid in engraving incision lines in accordance with implementations.

The spindles can include grooves that mirror location of blades in order to aid in engraving incision lines in the caps. For example, FIG. 13 shows a spindle 180 with a spindle head 181 that includes a groove 182 that is wide enough to accommodate all blades edges of a blade or a blade pattern.

Figure 14:
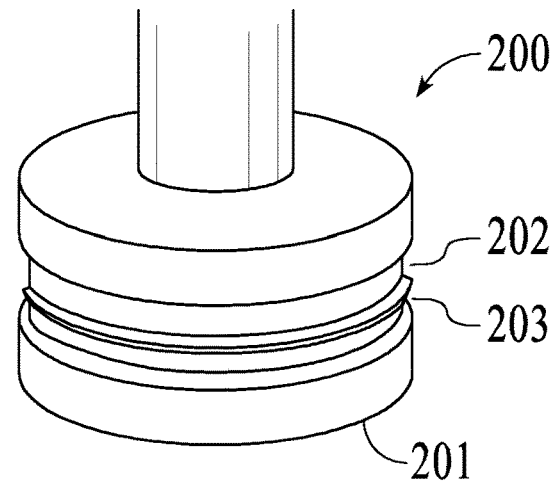

FIG. 14 shows a spindle 200 with a spindle head 201 that includes a groove 202 and a groove 203 that each are wide enough to accommodate one blade edge from a blade or blade composite of a blade pattern. In the implementation shown in FIG. 14, each "horizontal" blade edge has its own matching groove, where there are no grooves for vertical or diagonal blades or blade portions.

Figure 15:
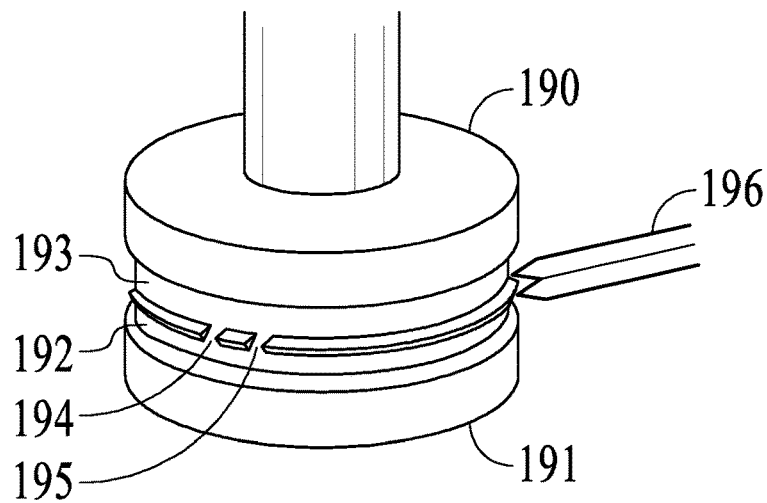

FIG. 15 shows a spindle 190 with a spindle head 191 that includes a groove 192, a groove 193, a groove 194 and a groove 195 that each are wide enough to accommodate one blade edge from a blade or blade portion as represented by blade edges of blade 196. In the implementation shown in FIG. 15, each "horizontal" blade has its own matching groove, and each vertical or diagonal blade or blade portion has its own matching groove.

Figure 16:
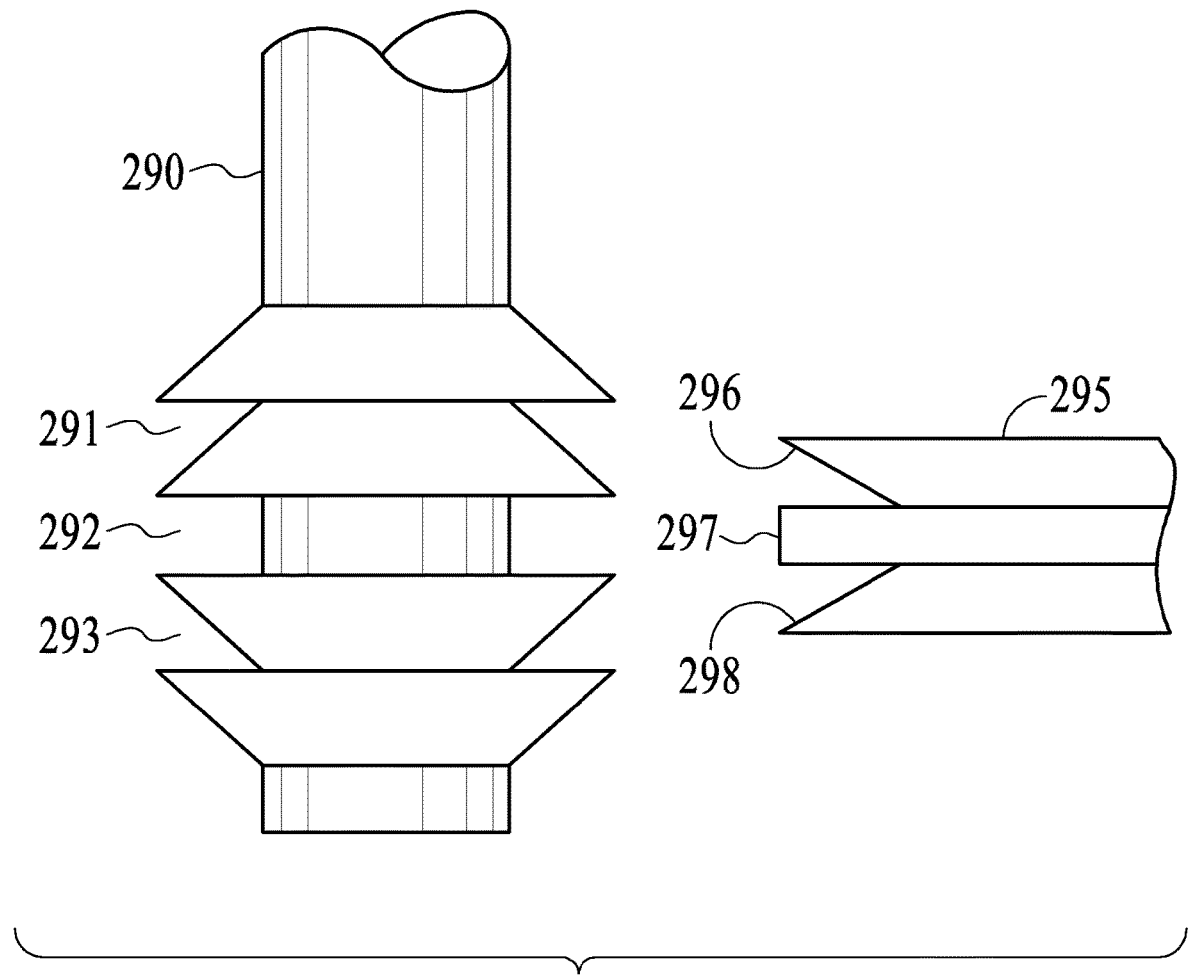

FIG. 16 shows a spindle 290 with a spindle head 294 that includes a groove 291, a groove 292, and a groove 293 that each are wide enough to accommodate one blade or one blade portion from a blade pattern. For example, blade combination 295 has a blade edge 296, a blade edge 297 and a blade edge 298. For example, groove 292 is present to allow for diagonal blades such as diagonal blades 152 and 154 shown in FIG. 10.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A method for producing a cap for a container, comprising:

forming the cap so that the cap has a top plate and a circular sidewall, wherein two opposite sides of the circular sidewall circularly connect to each other, one periphery of the circular sidewall connecting to one surface of the top plate forming a closed end, and another periphery of the circular sidewall at an opposite side of the closed end forms an opened end; and, cutting incision lines in the circular sidewall, the incision lines forming a ring member located at the opened end of the cap separated from a main body of the cap by a first incision line in between the opened end of the main body and the ring member, the ring member being connected to the main body by a plurality of connecting portions;

wherein a plurality of connecting pins are located along the first incision line so that the plurality of connecting pins connect the main body and the ring member at the two sides of the first incision line;

wherein a plurality of second incision lines are located on the main body or the ring member and located at one side of the plurality of connecting portions so that at least one of the plurality of second incision lines is connected with the first incision line and so that a first of the plurality of second incision lines does not connect with any other incision line;

wherein a first connecting portion from the plurality of connecting portions is in between the first of the plurality of second incision lines and the first incision line;

wherein a second connecting portion from the plurality of connecting portions is formed in between the first of the plurality of second incision lines and another of the plurality of second incision lines; and wherein the main body remains connected to the ring member by the first connecting portion and remains connected to the ring member by the second connecting portion even when the plurality of connecting pins are broken.

2. A method as in claim 1, wherein cutting of the incision lines is performed by a plurality of blades mounted on a blade support structure.

3. A method as in claim 1, wherein cutting of the incision lines is performed by a manufacturing system that includes:
spindles on which are mounted caps; and
a plurality of blades mounted on a blade support structure;
wherein the spindles rotate as the spindles pass by in closed proximity to the blade support structure so that the plurality of blades make incisions in the mounted caps as the spindles pass by, wherein the mounted caps include the cap, and wherein the incisions include incisions made in the cap to form the incision lines.

4. A method as in claim 1, wherein cutting of the incision lines is performed by a plurality of blades mounted on a blade support structure, the plurality of blades including:
a first blade including:
a first blade section,
a second blade section, the second blade section being located on a different plane than the first blade section, and
a third blade section that forms a diagonal connection between the first blade section and the second blade section;
a second blade including:
a first blade section that is located on a same plane as the first blade section of the first blade,
a second blade section that is located on a same plane as the second blade section of the first blade, and
a third blade section that forms a diagonal connection between the first blade section of the second blade and the second blade section of the second blade; and
a third blade that is located on the same plane as the first blade section of the first blade.

5. A method as in claim 1, wherein cutting of the incision lines is performed by a plurality of blades mounted on a blade support structure, the plurality of blades including:
a first blade, a second blade and a third blade all located on a first plane;
a fourth blade and a fifth blade both located on a second plane; and,
a sixth blade and a seventh blade both located on a third plane, the third plane being between the first plane and the second plane;
wherein the sixth blade and the seventh blade make smaller incisions than the other blades in the plurality of blades, wherein the smaller incisions are used to form part of the incisions lines.

6. A method as in claim 1, wherein cutting of the incision lines is performed by a plurality of blades mounted on a blade support structure, the plurality of blades including:
a first blade located on a first plane, the first blade having a first gap and a second gap;
a second blade and a third blade both located on a second plane; and
a fourth blade and a fifth blade both located on a third plane, the third plane being between the first plane and the second plane, the fourth blade being located near the first gap and the fifth blade being located near the second gap;
wherein the fourth blade and the fifth blade make smaller incisions than the other blades in the plurality of blades, wherein the smaller incisions are used to form part of the incisions lines.

7. A method as in claim 1, wherein cutting of the incision lines is performed by a plurality of blades mounted on a blade support structure, the plurality of blades including:
a first blade, a second blade and a third blade all located on a first plane;
a fourth blade and a fifth blade both located on a second plane; and,
a sixth blade and a seventh blade in a diagonal orientation between the first plane and the second plane.

8. A method as in claim 1, wherein cutting of the incision lines is performed by a manufacturing system that includes:
spindles on which are mounted caps; and
a plurality of blades mounted on a blade support structure;
wherein the spindles rotate as the spindles pass by in closed proximity to the blade support structure so that the plurality of blades make incisions in the mounted caps as the spindles pass by, wherein the mounted caps include the cap, and wherein the incisions include incisions made in the cap to form the incision lines; and,
wherein each spindle has one or more grooves matching locations of blades to aid in cutting incision lines.

* * * * *